INVENTORS
FRANK R. CARLOCK
B. WILLIAM KIPPENHAN
WILLIAM R. LAMOUREUX
NICHOLAS LAZARCHICK JR.

BY John B. Frisone
ATTORNEY

United States Patent Office 3,435,278

Patented Mar. 25, 1969

3,435,278

PINCUSHION CORRECTED DEFLECTION SYSTEM FOR FLAT FACED CATHODE RAY TUBE

Frank R. Carlock and B. William Kippenhan, Hyde Park, William R. Lamoureux, Kingston, and Nicholas Lazarchick, Jr., Hyde Park, N.Y., assignors to International Business Machines Corporation, Armonk, N.Y., a corporation of New York Filed June 30, 1966, Ser. No. 561,891

Int. Cl. H01j *29/70*

U.S. Cl. 315—24 6 Claims

ABSTRACT OF THE DISCLOSURE

A pincushion corrected deflection system for a cathode ray tube having first and second orthogonal deflection windings. First and second means are responsive respectively to first and second input signals defining the coordinates to which the beam of the cathode ray tube is to be deflected, and provide deflection currents corrected for the centerlines of the tube surface. First and second function generators, also responsive to the first and second input signals, provide a correction signal component accounting for maximum deviation from said centerlines. Third and fourth function generators connected to the first and second windings, respectively, provide attenuation control signals which are a function of the deflection current in the connected windings. The output of the first function generator is passed to the first winding in accordance with the output of the fourth function generator for correcting the current supplied to the first winding, and the output of the second function generator is passed to the second winding in accordance with the output of the third function generator for correcting the current supplied to the second winding, to eliminate pincushion distortion in the resultant image.

This invention relates to cathode ray display systems and more particularly to a pincushion corrected deflection system for use in flat tube cathode ray displays.

Cathode ray display tubes under computer control have been used extensively in the past for displaying alphanumeric data as well as graphic data. When these tubes are used for displaying alphanumeric data accuracy is not a prime consideration so long as the image portrayed on the tube screen is not unreasonably distorted. However, when these tubes are utilized for displaying graphic data for production of hard copies from which dimensions are taken, it is essential that the image created on the tube surface be faithful in all respects to the data creating the image. It is furthermore necessary that a tube having a flat screen be utilized if this requirement is to be met. The utilization of such a screen on the tube poses a serious problem with respect to pincushion distortion. Since the beam emanates from an effective point source and is deflected by the deflection circuits to the addressed locations, a spherical surface can provide an undistorted image without correction. However, when this type of surface is photographed, distortion is introduced into the image created. Therefore, it is essential that a flat screen be utilized for high precision image displays and that the image be corrected for the pincushion effect.

Many schemes for correcting pincushion distortion have been proposed each providing a solution for the problem. None of these solutions have proved entirely satisfactory for a highly accurate display from which dimensions may be taken. Each of these correction circuits operates on the beam to correct for the pincushion effect. However, the corrections are not always linear over the entire range of beam deflection nor are the corrections effective in the entire range.

One object of this invention is to provide a pincushion corrected display in which the correction is uniformly effective over the entire screen area.

Another object of this invention is to provide a pincushion corrected deflection circuit in which the deflection currents applied to the yoke are corrected to eliminate pincushion effect.

A further object of the invention is to provide a highly accurate cathode ray display which may be utilized to recreate images from digital data with a high degree of fidelity.

The invention contemplates a pincushion corrected deflection system for a cathode ray tube comprising, first and second orthogonal deflection windings, first and second means responsive respectively to first and second signals defining the coordinates to which the beam of the cathode ray tube is to be deflected and providing deflection currents corrected for the center lines of the tube surface, first and second function generators responsive to the first and second signals defining the coordinates, respectively, for providing a function of said coordinates, third and fourth function generators connected to the first and second windings, respectively, for providing a signal which is the function of the deflection current in the connected windings, means responsive to the first function generator and to the fourth function generator for correcting the current supplied to the first winding to eliminate pincushion distortion and means responsive to the second function generator and the third function generator for correcting the current supplied to the second winding to eliminate pincushion distortion in the resultant image.

The foregoing and other objects, features and advantages of the invention will be apparent from the following more particular description of a preferred embodiment of the invention as illustrated in the accompanying drawings.

Figure 1:
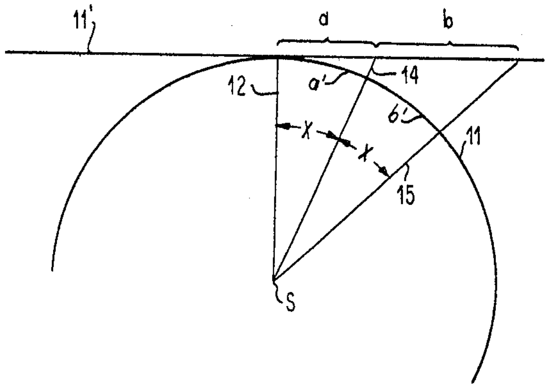
FIG. 1 is a schematic diagram illustrating the cause of the pincushion distortion.

FIG. 1 represents schematically a cross section of a spherical cathode ray tube 11. The beam is represented as emanating from a point source S and the radial lines 12, 14 and 15 represent the beam impinging on the surface 11 as well as on a flat surface 11'. It is obvious from this view that the linear distances on the surface 11', namely *a* and *b*, increase as the beam progresses to the right by equal angular displacements X from the normal position represented by line 12. However, on the circular section of the spherical surface 11, the arcuate distances *a'*, *b'* are equal for equal angular deflections X. Since the current supplied to the deflection coils produces for equal increments of current equal angular deflections of the beam, the linear displacement of the beam along a line on a flat faced tube will produce unequal deflections, thus a grid pattern would not be regular but would be shaped somewhat like a pincushion. In this respect, it should be noted that this distortion occurs in both the horizontal and vertical directions only one being shown here since the other would be identical. The sectional area is shown through the center of the tube and would be similar for orthogonal, horizontal and vertical lines through the center of the tube. In the quadrants between the intersecting lines the distortion would be more pronounced and will be at a maximum at the angular center or 45° line of each quadrant.

Figure 2:
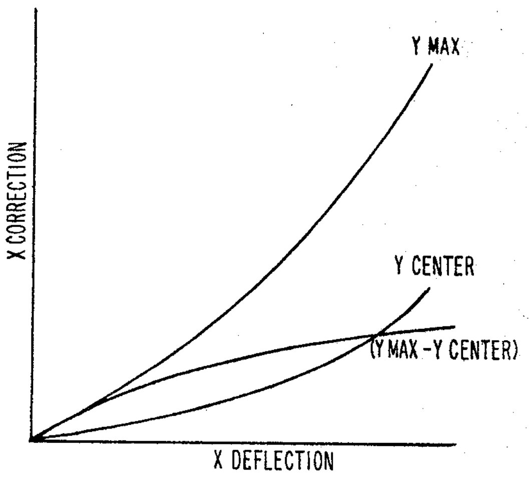
FIG. 2 is a graph illustrating the operation of the disclosed invention.

FIG. 2 discloses graphs defining the correction required in the X direction for a given deflection in X for various values of Y for a particular tube design. Here only two values of Y are shown, where Y is at the center of the screen and where Y is at either the uppermost or lowermost position. There are a finite number of curves in between the two shown. A third curve showing the difference between the corrections for Y maximum deflection and Y center deflection is also shown. How these curves enter into the circuit illustrated in FIG. 3 will become apparent as the description of FIG. 3 continues.

Figure 3:
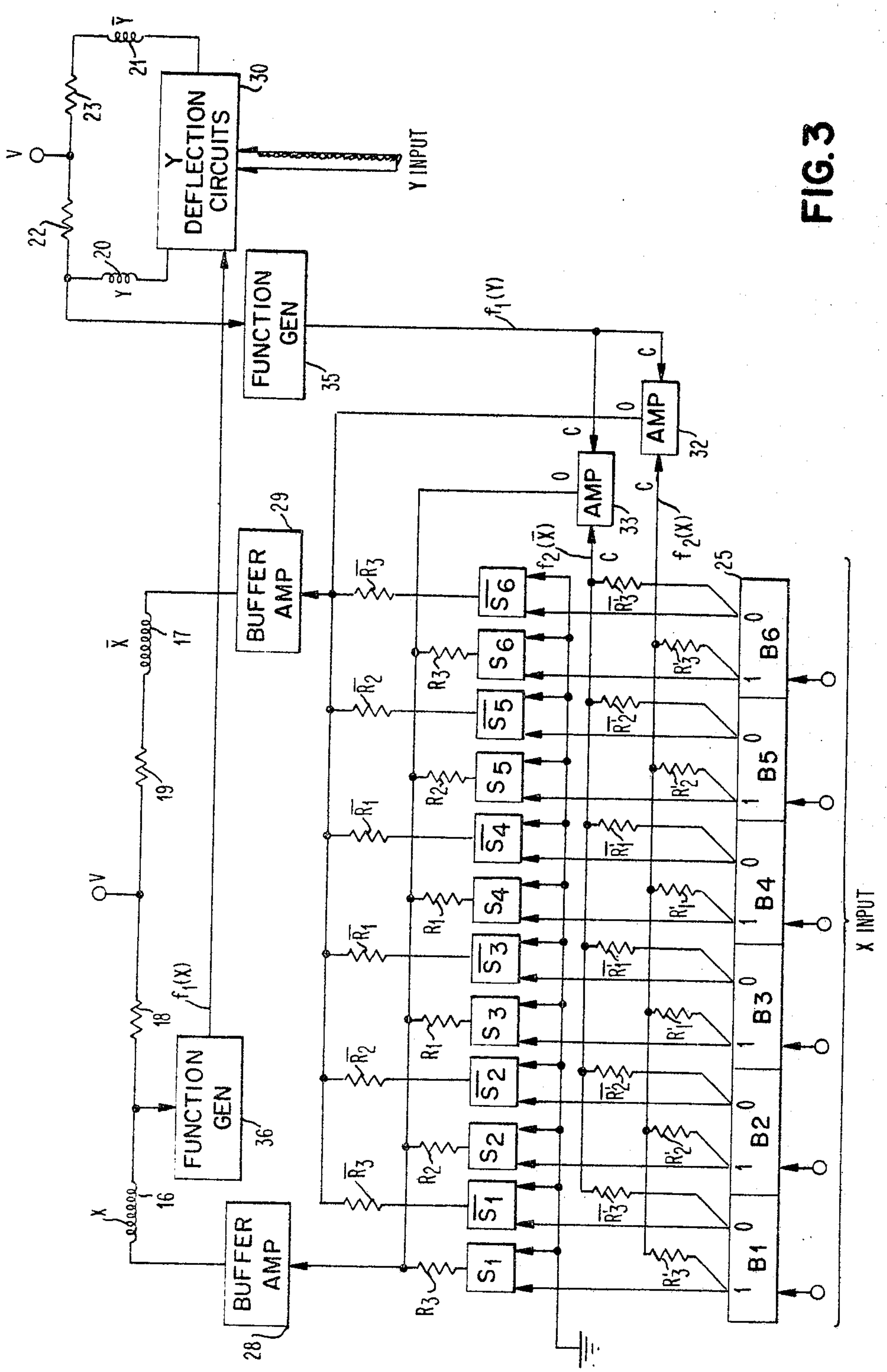
FIG. 3 is a schematic block diagram of the novel deflection system constructed according to the invention.

FIG. 3 illustrates schematically a push pull deflection system for a cathode ray tube. The X deflection winding is divided into two halves 16 and 17. These windings are connected to a source of direct current potential V by a pair of resistors 18 and 19, respectively. The Y deflection is controlled by a pair of push pull windings 20 and 21 which are connected to the source V by a pair of resistors 22 and 23, respectively.

A six bit signal defining the X coordinate is supplied by a source not shown. This is applied to the six inputs of a six bit register 25. In a practical embodiment many more positions than the six bit positions illustrated in register 25 would be employed since many more positions would be required to display an adequate amount of data. However, in order to simplify the explanation and the drawings a six by six coordinate system was chosen for illustration purposes. With this arrangement if the beam is to be located on the extreme left of the screen the six lines from the source will all be zero and the six triggers comprising register 25 labeled B1 through B6 will be in the zero state. If the beam is to be located at the extreme right the six triggers previously described will be set in the one state. Each trigger controls a unit of deflection in the X direction. When the first trigger is set to a one with the remaining set at zero the beam is positioned one unit to the right of the extreme left position. When the second is set the beam is positioned two units, the third will cause the beam to be positioned an additional unit to the right. The fourth, fifth and sixth each increment beam position by one unit to the point when all the triggers are set at the one position the beam is on the extreme right hand side of the screen. The one and zero outputs of the first trigger of register 25 are connected to switches S1 and $\overline{S1}$, respectively. These will enable the switches if the trigger is in one condition or the other. Thus if trigger B1 is set to a one condition, switch S1 will be enabled whereas if the trigger B1 is in the zero position, switch $\overline{S1}$ will be enabled. In a similar manner flip flops B2, B3, B4, B5 and B6 are connected to switches S2, $\overline{S2}$, S3, $\overline{S3}$, S4, $\overline{S4}$, S5, $\overline{S5}$ S6 and $\overline{S6}$ respectively. Each of the switches is connected between ground and a weighted resistor to provide a predetermined current when closed.

Switches S1, S2, S3, S4, S5 and S6 are connected via a plurality of weighted resistors or set forth above, to a buffer amplifier 28 which has its output connected to X winding 16. Resistors R3, R2, R1, R1, R2 and R3 in that order are connected from the switches S1–S6, respectively, to the input of buffer amplifier 28 and each limits the current supplied to winding 16 via the appropriate switches when enabled as previously described. Thus trigger B1 controls a smaller amount of current than triggers B2 and B3. The current supplied via B4 is identical with B3, B5 is identical with B2 and supplies less current than B3 or B4 and the current supplied via B6 is identical with that supplied via B1. Thus, the angular deflection produced by the current supplied when B1 is set to a one condition will be smaller to thus produce on a flat surface such as 11' a linear deflection that is equal in length to the deflection produced when any other trigger such as B3 or B4 is changed. In a similar manner switches $\overline{S1}$ $\overline{S2}$, $\overline{S3}$, $\overline{S4}$, $\overline{S5}$ and $\overline{S6}$ are connected by resistors $\overline{R3}$, $\overline{R2}$, $\overline{R1}$, $\overline{R1}$, $\overline{R2}$ and $\overline{R3}$, respectively, to a second buffer amplifier 29 the output of which is connected to $\overline{X}$ winding 17. The deflection system thus far described produces a corrected deflection along the horizontal center line of the screen. The Y or vertical deflection circuits shown generally in block form at 30 are identical in every respect to the X deflection circuits shown and are corrected for a vertical line passing through the center of the tube which is normal to the horizontal line described above.

With the circuit arrangement described above if the various stages of register 25 are all zero, switches $\overline{S1}$ through $\overline{S6}$ will be enabled placing full or maximum deflection current through winding 17. This will cause the beam to be positioned insofar as the horizontal axis is concerned at the left most position of the cathode ray tube. If the B1 stage stage is switched to a one switch $\overline{S1}$ deconditioned and switch S1 is conditioned. This sends a corrected unit of current through winding 16 and reduces the current in winding 17 by an equal amount. The current is corrected or compensated by resistor R3 so that at the extreme left position a small angular deflection in the beam is produced causing a equal linear displacement of the beam on the flat surface. When the second stage B2 switches in addition to B1, the switch $\overline{S2}$ is deconditioned, both switch S1, S2 are conditioned and an additional unit of current as determined by resistor R2 is switched into winding 16 and out of winding 17 causing the beam to move on the flat surface of the tube another equal linear unit. This progressive change will be repeated as the various stages are switched from zero to one until when all of the stages, that is stages B1 through B6 are one, maximum deflection current is passing through winding 16 and zero deflection current through winding 17 thus causing the beam to be positioned at the extreme right hand side of the cathode ray tube screen.

As previously stated, however, the correction produced by resistors R3 through R1 and R1 through R3 is only valid when Y is centered, that is, for any other values of Y the correction must be changed. This is brought out in FIG. 2 where the graph shows the correction in X for the X deflection as a function of the value of Y. The minimum correction which is produced by resistors R3 through R1 and R1 through R3 is shown on the curve labeled Y center. However, as Y increases or deviates from the center either above or below, the correction factor must be increased. The maximum correction is shown by the curve Y maximum. For each addressable position between the center and the maximum Y deflection either above or below there will be a different curve positioned between the two above identified curves. The third curve shown on FIG. 2 is as previously stated the difference between the center or minimum correction and the maximum value of Y or maximum deviation from the center, which could be etiher above or below the horizontal center.

The difference curve is utilized in the invention and resistors R3' through R1' and R1' through R3' and $\overline{R3}$' through $\overline{R1}$' and $\overline{R1}$' through $\overline{R3}$' connected to the one and zero outputs, respectively, of the stages of register 25 will produce this curve for any value of X. These resistors are weighed to produce this curve and do it for both sides of the push pull winding, namely resistors R3', R2', R1', R1', R2' and R3' connected to the one output provide a signal which is a function of the X deflection whereas the resistors $\overline{R3}$' through $\overline{R1}$' and $\overline{R1}$' through $\overline{R3}$' connected to the zero output of the stages of register 25 provide a signal which is a function of the $\overline{X}$ deflection which is applied to winding 17.

The function of X is connected to an amplifier 32 and sets the operating point of that amplifier whereas the function of $\overline{X}$ is connected to an amplifier 33 and sets the operating condition of that amplifier. A function generation circuit 35 connected to the common junction of winding 20 and resistor 22 provides a function of Y which indicates the value of the Y deflection and the position of the beam with respect to the Y axis. The function of Y is applied to amplifiers 32 and 33 to indicate what portion of the (Y maximum minus Y center) curve is to be applied as a correction factor for the actual displacement in the Y direction.

The output of amplifier 32 is connected to buffer amplifier 29 whereas the output of amplifier 33 is connected to buffer amplifier 28. The $\overline{X}$ function is applied to the X winding 16 since a subtraction of current from the $\overline{X}$ winding may be effected by a corresponding increase in the $\overline{X}$ winding. Likewise the X function is applied to the $\overline{X}$ winding 17 since a reduction of the current in the X winding 16 may be effected by increasing the current in the $\overline{X}$ winding 17. This arrangement is arbitrary and a circuit for reducing the actual current could have been employed. However, this arrangement with existing components is more convenient and requires less circuitry than the subtraction of current. Therefore its use is merely an expedient and not essential for the operation of this circuit. A function generator 36 connected to the common junction of winding 16 and resistor 18 has its output connected to the Y deflection circuits 30 and provides the same operating characteristics as the function generator 35 for the Y deflection. This again is necessary since the Y deflection correction depends on the value of the X deflection just as the X deflection correction depends on the actual Y deflection.

Figure 4:
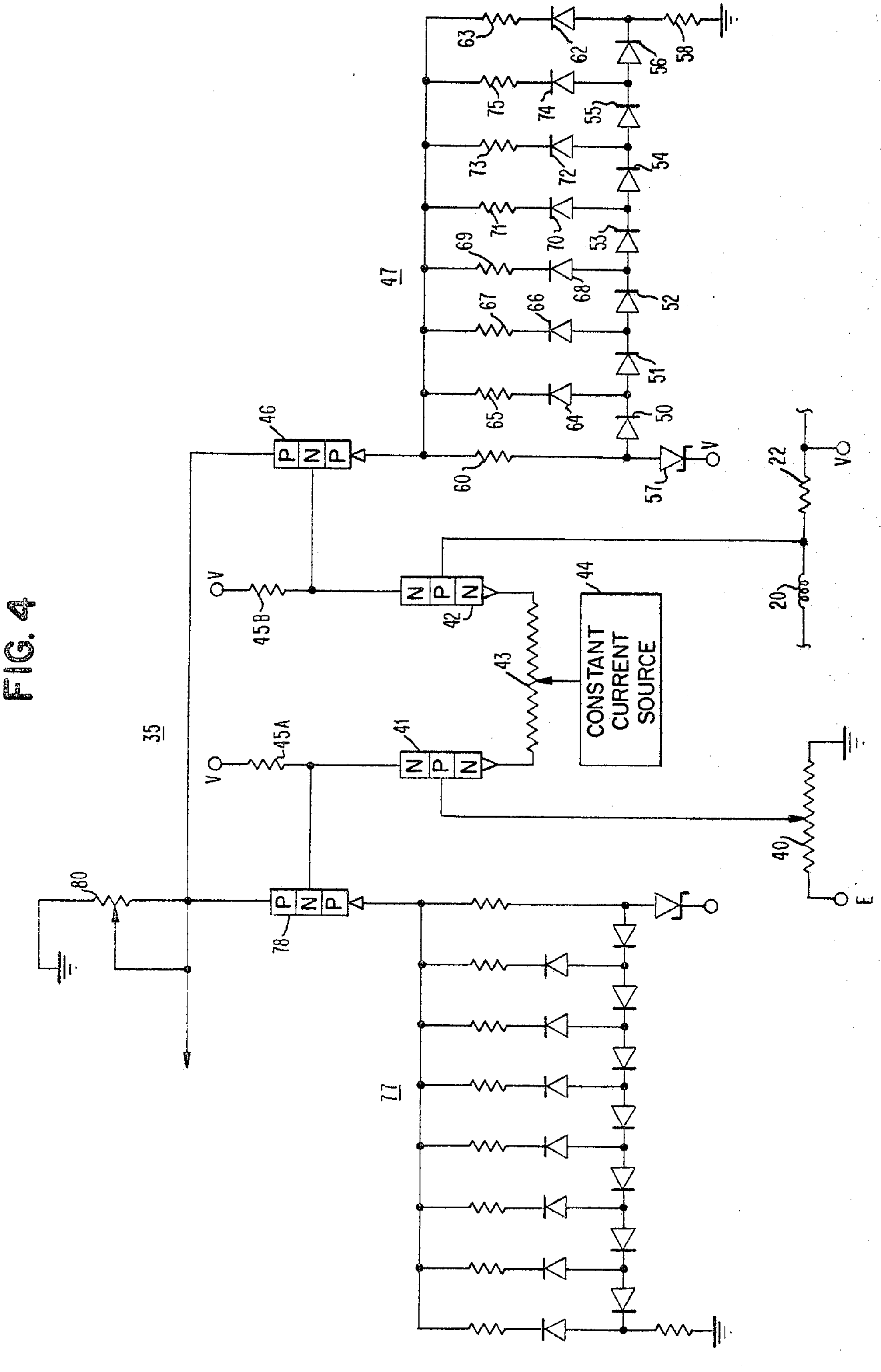
FIG. 4 is a schematic diagram of a function generator shown in block form in FIG. 3.

The components shown in FIG. 3 with the exception of the function generators 35 and 36, which may be identical, are conventional in all respects and are shown in no greater detail. Since the function generation as contemplated by circuits 35 and 36 is somewhat unique the details of the circuits are shown in FIG. 4. In FIG. 4 a reference voltage E is applied to one side of a grounded potentiometer 40 and the wiper of potentiometer 40 is connected to the base of a transistor 41. Trainsistor 41 and another transistor 42 comprise a differential amplifier. The emitters of the two transistors are connected together by a potentiometer 43, the wiper of which is connected to a constant current source 44. The collectors of transistors 41 and 42 are connected to a positive potential source V by resistors 45A and 45B, respectively. The common junction of resistor 22 and winding 20 shown in FIG. 3 is connected to the base of transistor 42. The potential E applied to the base of transistor 41 via potentiometer 40 is selected and the setting of potentiometer 40 is selected to provide an equal current through transistor 41 and 42 when the current through the winding 20 equals the current through winding 21 since at this point the Y deflection is at the center of the screen when viewed in the vertical direction. If the beam is moved downward the current through winding 20 decreases causing a smaller drop across resistor 22 which raises the potential at the base of transistor 42. This higher potential increases the conduction through transistor 42 and as a result of the constant current source 44 the transistor 41 conducts less to make up for the increased current through transistor 42. The increase in current through transistor 42 decreases the potential of the base of another transistor 46. As the base of transistor 46 decreases in potential the current through the transistor increases lowering the potential of the emitter which is connected to a diode and resistive network 47 which loads the transistor 46.

Figure 5:
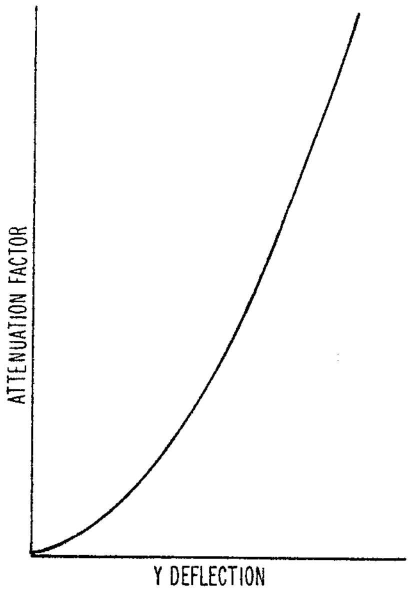
FIG. 5 is a graph illustrating the output of the circuit shown in FIG. 4.

Matrix 47 comprises a plurality of diodes 50–56 connected in series between a Zener diode 57 and a grounded resistor 58. Diodes 50–56 comprise a voltage divider network each diode of which provides a drop in voltage across the diode. Zener diode 57 is connected to a voltage source V and by a resistor 60 to the emitter of transistor 46. Grounded resistor 58 is connected to the emitter of transistor 46 by a diode 62 and a resistor 63. The common junctions of the diodes 50, 51, 52, 53, 54, 55 and 56 are connected to the emitter of transistor 46 by a diode in series with a resistor. The junction of diodes 50 and 51 is connected to the emitter of transistor 46 by a diode 64 in series with a resistor 65, the junction of diode 51 and 52 is connected to the emitter by a diode 66 and the series resistor 67, the junction of diode 52 and 53 by a diode 68 and a series resistor 69. The junction of diodes 53 and 54 is connected to the emitter of transistor 46 by a diode 70 in series with a resistor 71, the junction of diodes 54 and 55 is connected to the emitter by a diode 72 in series with a resistor 73 and the junction of diodes 55 and 56 is connected to the emitter of transistor 46 by a series connected diode 74 and a resistor 75. With this arrangement as the emitter of the transistor 46 becomes more negative the resistors 65, 67, 69, 71, 73, 75 and 63 are placed in parallel with resistor 60. These resistors are weighted to produce the curve shown in FIG. 5 at the output or collector of transistor 46. The curve shown in FIG. 5 is the attenuation factor versus the magnitude of the Y deflection. This attenuation is the voltage applied to the amplifiers 32 and 33. Zener diode 57 is utilized to maintain the common junction of diode 50 and Zener diode 57 at a standard potential so that any variations produced by changing the signal applied to the base of transistor 46 will be reflected at the emitter of transistor 46 to cause the diodes 64, 66, 68, 70, 72, 74 and 62 to be in that order progressively forward biased thus progressively connecting resistor 65, 67, 69, 71, 73, 75 and 63 in parallel with resistor 60 as the voltage at the emitter becomes more negative. A similar matrix 77 is connected to the emitter of another transistor 78 which is connected to the collector of transistor 41.

Circuit 77 comes into play when the current through winding 20 increases. This causes a decrease in the voltage at the common junction of resistor 22 and winding 20. This decrease in voltage causes the transistor 42 to conduct less thus increasing the conduction through transistor 41. As the conduction through transistor 41 increases the potential of the collector decreases as described previously for transistor 42 and this controls a transistor 78 in a manner similar to transistor 46. It should be noted at this point that with equal currents through transistors 41 and 42, as determined by constant current source 44, both transistors 46 and 78 are cut off and the networks 47 and 77 are inoperative. However, as the current through winding 20 increases the potential at the base of transistor 42 decreases causing the transistor 42 to conduct less and the transistor 41 to increase conduction. As the current through transistor 41 increases the base of transistor 78 becomes more negative and produces the same effect on matrix 77 as was previously described with respect to 47. The two matrices 77 and 47 are provided since the current increases from the center position on the screen if the beam is moving upward and the current decreases from the center position as the beam moves downward. Thus the same type of correction is required for both an increase and a decrease in the current from the center screen level. The two circuits provide the exact same voltage output in different directions from the center of the screen. The collector of transistor 78 is connected in parallel with the collector of transistor 46 and provides the same output. A potentiometer 80 is connected between the emitters of transistors 46 and 78 to ground in order to normalize the voltage output and set the base of the curve shown in FIG. 5.

While the invention has been particularly shown and described with reference to a single preferred embodiment thereof, it will be understood by those skilled in the art that various changes in form and detail may be made therein without departing from the spirit and scope of the invention.

What is claimed is:

1. A deflection system for a cathode ray tube comprising, first and second deflection windings for controlling ray deflection in substantially orthogonal directions as a function of the currents therethrough, first means connected to said first deflection winding and responsive to a first coded signal for providing variable currents to said winding such that the angular beam deflections between adjacent addressable points increase as the beam approaches the normal position to the tube surface, and second means connected to said second deflection winding and responsive to a second coded signal for providing variable currents to said winding such that the angular beam deflections between adjacent addressable points increases as the beam approaches the normal position to the tube surface whereby equilinear beam deflections along the center lines of the screen of the cathode ray tube are produced, said first and second means each including a multiposition register responsive to the respective coded signal applied thereto, switch means associated with each said register position and responsive to the state of said register, a buffer amplifier connected to the respective winding, and a plurality of weighted impedances each connecting one switch means to the amplifier to provide weighted currents via the amplifier to the winding.

2. A deflection system for a cathode ray tube comprising, first and second deflection means for controlling ray deflection in substantially orthogonal directions as a function of the signals applied thereto, first means connected to said first deflection means and responsive to a first coded address signal for providing variable deflection signals to said means such that the angular beam deflections in the specified direction between adjacent addressable points increases as the beam approaches the normal position to the tube surface, second means connected to said second deflection means and responsive to a second coded address signal for providing variable deflection signals to said means such that the angular beam deflections in the specified direction between adjacent addressable points increases as the beam approaches the normal position to the tube surface, first and second function generators responsive to the first and second coded address signals, respectively, each providing a function, determined by the tube parameters, of its said associated address signals, third and fourth function generators responsive to the first and second deflection means, respectively, each providing a function, determined by the tube parameters, of its said associated deflection signal, third means responsive to the first and fourth function generators for providing a pincushion correction signal to the first deflection means, and fourth means responsive to the second and third function generators for providing a pincushion correction signal to the second deflection means whereby pincushion distortion is corrected over the entire display surface, said first and second means each including a multiposition register responsive to the respective coded address signals applied thereto, switch means associated with each said register position and responsive to the state of said position, and a plurality of weighted impedances each connecting one switch means to its respective deflection means to provide weighted signals to the connected deflection means.

3. A deflection system as set forth in claim 2 in which said first function generator includes a plurality of weighed impedances each connecting one associated switch means to the said third means to provide a control signal which is a function of the said first coded signal, and said second function generator includes a plurality of weighted impedances each connecting one associated switch means to the said fourth means to provide a control signal which is a function of the said second coded signal.

4. A push pull deflection system for a cathode ray tube comprising, first and second push pull deflection winding means for controlling ray deflection in substantially orthogonal directions, first means connected to said first push pull deflection winding means and responsive to a first coded address signal for providing a net variable deflection current to said winding means such that the angular beam deflection in the specified direction between adjacent addressable points increases as the beam approaches the normal position to the tube surface, second means connected to said second push pull deflection winding means and responsive to a second coded address signal for providing a net variable deflection current to said winding means such that the angular beam deflection in the specified direction between adjacent addressable points increases as the beam approaches the normal position to the tube surface, first and second function generator means responsive to the first and second coded address signals, respectively, each providing a function, determined by the tube parameters of its said associated address signal, third and fourth function generator means responsive to the first and second push pull deflection winding means, respectively, each providing a function, determined by the tube parameters, of the current in the connected deflection winding.

third means responsive to the first and fourth function generator means for providing a pincushion correcting current to the first push pull winding means, and fourth means responsive to the second and third function generator means for providing a pincushion correction current to the second push pull winding means whereby pincushion distortion is correction over the entire display surface.

5. A deflection system as set forth in claim 4 in which said first and second means each include, a multiposition register having a binary element in each position responsive to the respective coded address signal applied thereto, a pair of switches associated with each register position and responsive to the state of the associated binary element, a first plurality of weighted resistors each connecting one switch associated with each position to one side of the push pull winding means to provide, a weighted deflection current which is a function of the coded address signal, in one direction, and a second plurality of weighted resistors each connected to the other switch associated with each position to the other side of the push pull winding means to provide, a weighted deflection current which is a function of the coded address signal, in the other direction.

6. A deflection system as set forth in claim 5 in which said first function generator includes, a first pluarity of weighted resistors each connected to one output of the said associated binary elements and to the said third means to provide a control signal which is a function of the said first address signal for controlling the net variable deflection current in the associated push pull winding in one direction, a second plurality of weighted resistors each connected to the other output of said associated binary elements and to the said third means to provide a control signal which is a function of the complement of the said first address signal for controlling the net variable deflection current in the associated push pull winding in the other direction, and said second function generator includes, a first plurality of weighted resistors each connected to one output of the said associated binary elements and to the said fourth means to provide a control signal which is a function of the said second address signal for controlling the net variable deflection current in the associated push pull winding in one direction, and a second plurality of weighted resistors each connected to the other output of the said associated binary elements and to said fourth means to provide a control signal which is a function of the complement of the said second address signal for controlling the net variable deflection current in the associated push pull winding in the other direction.

References Cited

UNITED STATES PATENTS

| | | | |
|---|---|---|---|
| 3,205,377 | 9/1965 | Nix | 315—24 X |
| 3,309,560 | 3/1967 | Popodi | 315—24 |

RICHARD A. FARLEY, *Primary Examiner.*

T. H. LUBBESING, *Assistant Examiner.*

U.S. Cl. X.R.

315—26